(12) United States Patent
Huenink et al.

(10) Patent No.: US 12,391,189 B2
(45) Date of Patent: Aug. 19, 2025

(54) QUICK RELEASE MOBILE DEVICE HOLDER

(71) Applicant: Deere & Company, Moline, IL (US)

(72) Inventors: Brian M. Huenink, Cedar Grove, WI (US); Michael W. Thompson, Clayton, IN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/670,845

(22) Filed: May 22, 2024

(65) Prior Publication Data
US 2025/0206237 A1 Jun. 26, 2025

Related U.S. Application Data

(60) Provisional application No. 63/613,380, filed on Dec. 21, 2023.

(51) Int. Cl.
B60R 11/00 (2006.01)
F16M 13/00 (2006.01)

(52) U.S. Cl.
CPC ........... B60R 11/00 (2013.01); F16M 13/005 (2013.01); *B60R 2011/0071* (2013.01)

(58) Field of Classification Search
CPC ............ B60R 11/00; B60R 2011/0071; F16M 13/005
USPC ........................ 248/689; 455/575.1
See application file for complete search history.

(56) References Cited

U.S. PATENT DOCUMENTS

| | | | |
|---|---|---|---|
| 10,491,727 B1 * | 11/2019 | Liu | H04M 1/04 |
| 2014/0003021 A1 * | 1/2014 | Bury | F16M 11/041 |
| | | | 248/274.1 |
| 2014/0091192 A1 * | 4/2014 | Mersky | F16M 11/08 |
| | | | 248/447 |
| 2016/0014243 A1 * | 1/2016 | Snowden | H04M 1/04 |
| | | | 455/575.1 |
| 2023/0247124 A1 * | 8/2023 | Taylor | H04M 1/04 |
| | | | 455/575.1 |

OTHER PUBLICATIONS

DADAO Metal Car Phone Holder; screenshot captured on May 28, 2024; https://www.amazon.in/stores/page/04C02118-9758-4E68-8344-9CAC41861674?ingress=2&visitId=6a9c4c3d-69dc-46ed-b5c1-7cdde9216c4e&ref_=ast_bln ; (5 pages).
TOPGO Cup Phone Holder For Car; screenshot captured on May 28, 2028; https://www.amazon.ca/stores/TOPGO/page/7484261D-54F8-4486-86F8-8261E08379F2?ref _=ast_bln&store_ref=bl_ast_dp_brandLogo_sto ; (9 pages).

* cited by examiner

Primary Examiner — Todd M Epps
(74) Attorney, Agent, or Firm — Andrew T. Ball; Lucian Wayne Beavers; Patterson Intellectual Property Law, PC

(57) ABSTRACT

Disclosed herein are example mobile device holders having an adjustable retaining device for adjustably sizing a mobile device enclosure. The adjustable retaining device can include one or more adjustable arms extending from the body of the device holder. The adjustable retaining device can also include a corresponding number of engagement members disposed on the ends of the one or more adjustable arms. The one or more adjustable arms and the one or more corresponding engagement members can move from an undeflected state to a deflected state when a mobile device is introduced to the enclosure, and may be biased, for example by spring elements, to return to the undeflected state when the mobile device is removed from the enclosure.

20 Claims, 13 Drawing Sheets

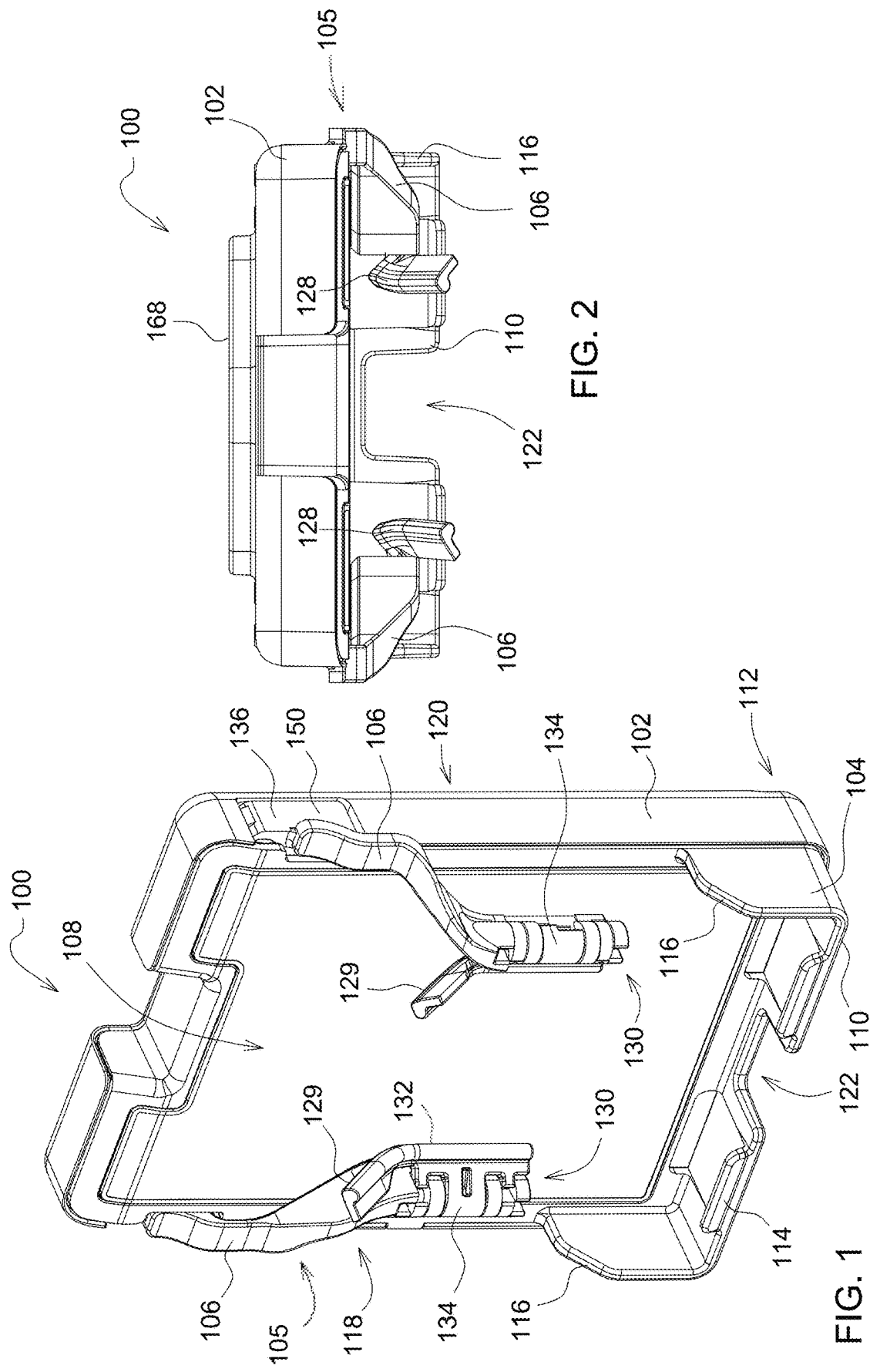

QUICK RELEASE MOBILE DEVICE HOLDER

RELATED APPLICATIONS

This application is a conversion of U.S. Provisional Application No. 63/613,380, filed on Dec. 21, 2023, to which it claims priority.

FIELD

The present disclosure relates generally to mobile device holders and particularly to mobile device holders configured to support one-handed insertion and removal of a mobile phone or other mobile device from the holder.

BACKGROUND

Mobile devices, such as cellular phones and tablets are an integral part of daily life, and are relied on by users in many personal and professional aspects of their routines. Accordingly, there is a desire, and in some cases even a need, for many users to utilize their mobile devices even when they are busy with other tasks, such as operating and driving a vehicle.

However, it can be inconvenient to use a mobile device in an environment where one or both hands are continuously required for other tasks. For example, users operating a vehicle, such as a work vehicle or personal vehicle frequently require one or both hands for steering and/or operating vehicle features. In such circumstances, it can be difficult to keep a mobile device accessible and useable for the vehicle operator, and many current locations for positioning a mobile device while operating a vehicle are inconvenient, distracting, or may provide challenges when accessing the mobile device.

What is needed, then, is a mobile device holder that allows easy docking and undocking of a mobile device, while maintaining the usability of the device even when both hands of the vehicle operator are busy with vehicle operation tasks.

BRIEF SUMMARY

Disclosed herein are example mobile device holders which mount a mobile device in a vehicle. The mobile device holders disclosed herein allow for full (that is, unobstructed) view of the mobile device screen. According to some aspects of the present disclosure, the mobile device holders disclosed herein can include one or more adjustable retaining arms that define or partially define an enclosure for retaining a mobile device. According to some aspects of the present disclosure, one side of the enclosure can be open to facilitate insertion of the mobile device. According to some aspects of the present disclosure, the mobile device can be removed from the enclosure by pulling it against the one or more adjustable retaining arms.

Certain examples concern a self-adjusting mobile device holder. The mobile device holder includes a holder body and a bottom support bracket. The bottom support bracket has a bottom portion extending in a forward direction from a lower portion of the holder body. The mobile device holder also includes a first retaining arm assembly including a first retaining arm and a first gripper portion connected to the first retaining arm, and a second retaining arm assembly including a second retaining arm and a second gripper portion connected to the second retaining arm. The holder body, the bottom support bracket, and the first and second retaining arm assemblies together at least partially define an adjustable enclosure for receiving a mobile device. The first and second retaining arms are connected to opposite lateral sides of the holder body so that the first and second retaining arms can be moved laterally away from and toward each other to adjust a width of the enclosure. The first and second gripper portions are connected to the first and second retaining arms, respectively, so that the first and second gripper portions can be moved in a forward direction away from the holder body to adjust a depth of the enclosure to receive the mobile device in the enclosure or to release the mobile device from the enclosure.

Certain examples concern a mobile device holder. The mobile device holder comprises a holder body at least partially defining an adjustable enclosure. The mobile device holder also comprises an adjustable retaining device configured to retain a mobile device in the adjustable enclosure. The adjustable retaining device is movable from an undeflected state to a deflected state to adjust a size of the enclosure and admit the mobile device to the adjustable enclosure and resiliently biased to automatically return from the deflected state to the undeflected state when the mobile device is removed from the adjustable enclosure. The adjustable retaining device is movable relative to the holder body in at least a first direction and a second direction transverse to the first direction.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

A full and enabling disclosure of the aspects of the invention, directed to one of ordinary skill in the art, is set forth in the specification, which makes reference to the appended figures, in which:

FIG. 1 is a front top perspective view of a mobile device holder according to one aspect of the present disclosure.

FIG. 2 is a top view of the mobile device holder of FIG. 1.

DETAILED DESCRIPTION

Figure 4:
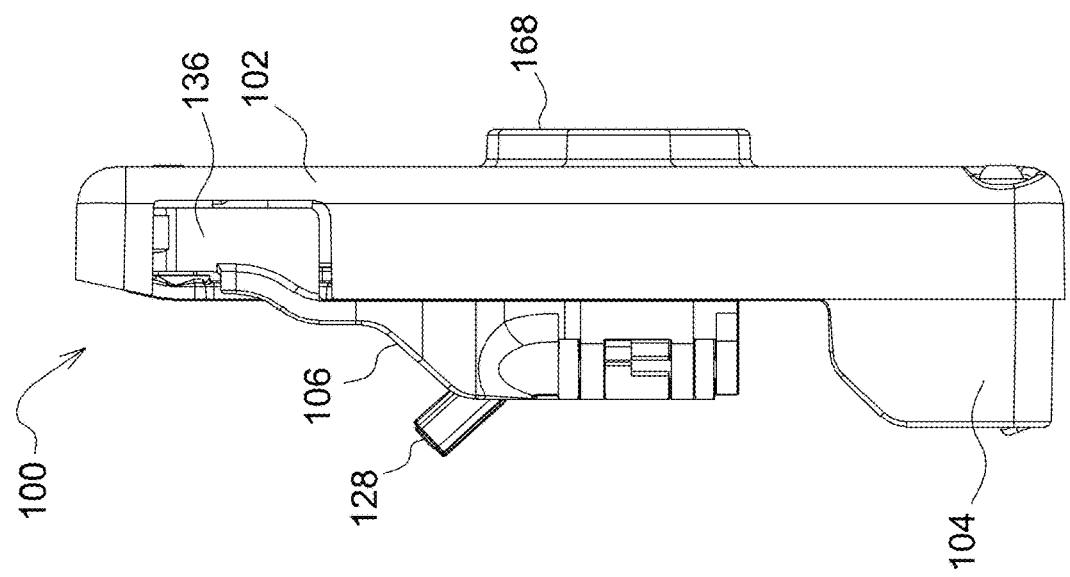
FIG. 4 is a side view of the mobile device holder of FIG. 1.

Reference will now be made in detail to aspects of the disclosure, one or more examples of which are illustrated in the drawings. Each example is provided by way of explanation, not limitation, of the disclosure. It will be apparent to those skilled in the art that various modifications and variations can be made to the examples presented in the present disclosure without departing from the scope or spirit thereof. For instance, features disclosed as part of one example can be used in conjunction with features of another example to yield a still further example. Thus, it is intended that the present disclosure covers such modifications and variations as come within the scope of the claims and their equivalents.

General Terms

The word "exemplary" is used herein to mean "serving as an example, instance, or illustration." Any implementation described herein as "exemplary" is not necessarily to be construed as preferred or advantageous over other implementations.

As used herein, the terms "first," "second," "third," and so on may be used interchangeably to distinguish one component from another and are not intended to signify location or importance of the individual components.

The terms "coupled," "fixed," "attached to," and the like refer both to direct coupling, fixing, or attaching, as well as indirect coupling, fixing, or attaching through one or more intermediate components or features, unless otherwise specified herein.

The singular forms "a," "an," and "the" include plural references, unless the context clearly indicates otherwise.

Unless otherwise indicated, all numbers expressing dimensions of components, percentages, temperatures, weights, and so forth, as used in the specification or claims are to be understood as being modified by the term "about." Accordingly, unless otherwise indicated, implicitly or explicitly, the numerical parameters set forth are approximations that can depend on ordinary manufacturing tolerances, minor design variations, or limits of the measuring technique used. When directly and explicitly distinguishing embodiments from discussed prior art, the embodiment numbers are not approximates unless the word "about" is recited. Furthermore, not all alternatives recited herein are equivalents.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Introduction to the Disclosed Technology

Disclosed herein are aspects of a mobile device holder and system for mounting a mobile device holder to one or more features within a vehicle, such as a work vehicle. Generally, the mobile device holders disclosed herein have an enclosure or a partial enclosure configured to receive a mobile device (for example, a mobile phone or a tablet). The mobile device holders disclosed herein generally also include one or more adjustable retaining arms configured to apply a retaining force to retain the mobile device in the enclosure.

According to the aspects of the disclosure presented herein, the mobile device holder can also be mounted on a adjustable mounting arm. The adjustable mounting arm can be attached to one or more features within the cabin of a vehicle (for example, a work vehicle).

Advantageously, this combination of features allows a mobile device to be easily introduced to the mobile device holder, retained in the field of view of a vehicle operator, and used in a handless or one-handed fashion. Additionally, this combination of features allows the mobile device to be easily removed from the mobile device holder.

Aspects of the Disclosed Technology

FIG. 1 shows a self-adjusting mobile device holder 100 according to one aspect of the present disclosure. The mobile device holder 100 includes a holder body 102, a bottom support bracket 104, and an adjustable retaining device comprising at least one retaining arm assembly 105, such as the first and second retaining arm assemblies shown in FIG. 1. The retaining arm assembly 105 comprises one or more adjustable retaining arms 106 extending from the holder body 102, for example, the first and second retaining arms 106 shown in FIG. 1. The holder body 102, the bottom support bracket 104 and the one or more adjustable retaining arms 106 define or partially define an adjustable enclosure 108 which is configured to receive a mobile device, such as a cellular phone or tablet. According to some aspects of the present disclosure, such as that shown in FIGS. 1-4, the adjustable enclosure 108 can be partial (that is, it can be open or partially open along one or more sides of the adjustable enclosure 108). It is to be understood, however, that in some aspects of the present disclosure, the adjustable enclosure 108 can be more fully surrounded by the holder body 102, the bottom support bracket 104 and the one or more adjustable retaining arms 106.

As shown in FIG. 4, the bottom support bracket 104 and the adjustable retaining arms 106 can extend in a forward direction from a front side of the holder body 102. A mount 168 can extend in a rearward direction from a back side of the holder body 102, and can allow the mobile device holder 100 to be connected to a mounting assembly, such as is discussed in greater detail herein in relation to FIGS. 8 and 9.

Returning to FIG. 1, the bottom support bracket 104 can comprise a bottom ridge bottom portion 110 that extends from a lower portion 112 of the holder body 102. The bottom ridge portion 110 provides a bottom stop against which a mobile device can rest when the mobile device is retained in the adjustable enclosure 108 of the mobile device holder 100. According to some aspects of the present disclosure, the bottom ridge portion 110 can also include one or more guides 114 that define a notch or groove that can receive a bottom edge portion of a mobile device, as described in greater detail herein. In such aspects of the present disclosure, the one or more guides 114 can help to secure the bottom edge portion of the mobile device within the adjustable enclosure 108 and prevent inadvertent release and/or escape of the mobile device from the adjustable enclosure 108.

With continued reference to FIG. 1, the bottom support bracket 104 can also include vertically extending side walls 116. The side walls 116 can, as shown in FIG. 1, extend upwards along the left side 118 and the right side 120 of the holder body 102. The side walls 116 serve to define the left and right extremities of the adjustable enclosure 108 and may be spaced apart at a distance to accommodate a variety of mobile devices, such as mobile phones of different widths and/or tablets, which may have greater widths than the mobile phones. It will be appreciated by those skilled in the art that, because of the one or more adjustable retaining arms 106, discussed in greater detail below, it is not necessary for the width of the space between the side walls 116 of the bottom support bracket 104 to match or even to approximate the width of the mobile device to be retained, as the one or more adjustable retaining arms 106 are capable of retaining mobile devices having a range of widths due to their adjustable nature.

According to one aspect of the present disclosure, the bottom support bracket 104 can also define an access notch 122, which can, as shown in the example illustrated in FIGS. 1 and 2, be disposed towards the middle of the bottom support bracket 104. The access notch 122 can provide access to one or more features disposed along the bottom end of a mobile device retained in the adjustable enclosure 108, such as a charging port, a data input/output port, an audio port, one or more buttons or switches or any other feature that might be accessible along the bottom edge of the mobile device.

Figure 3:
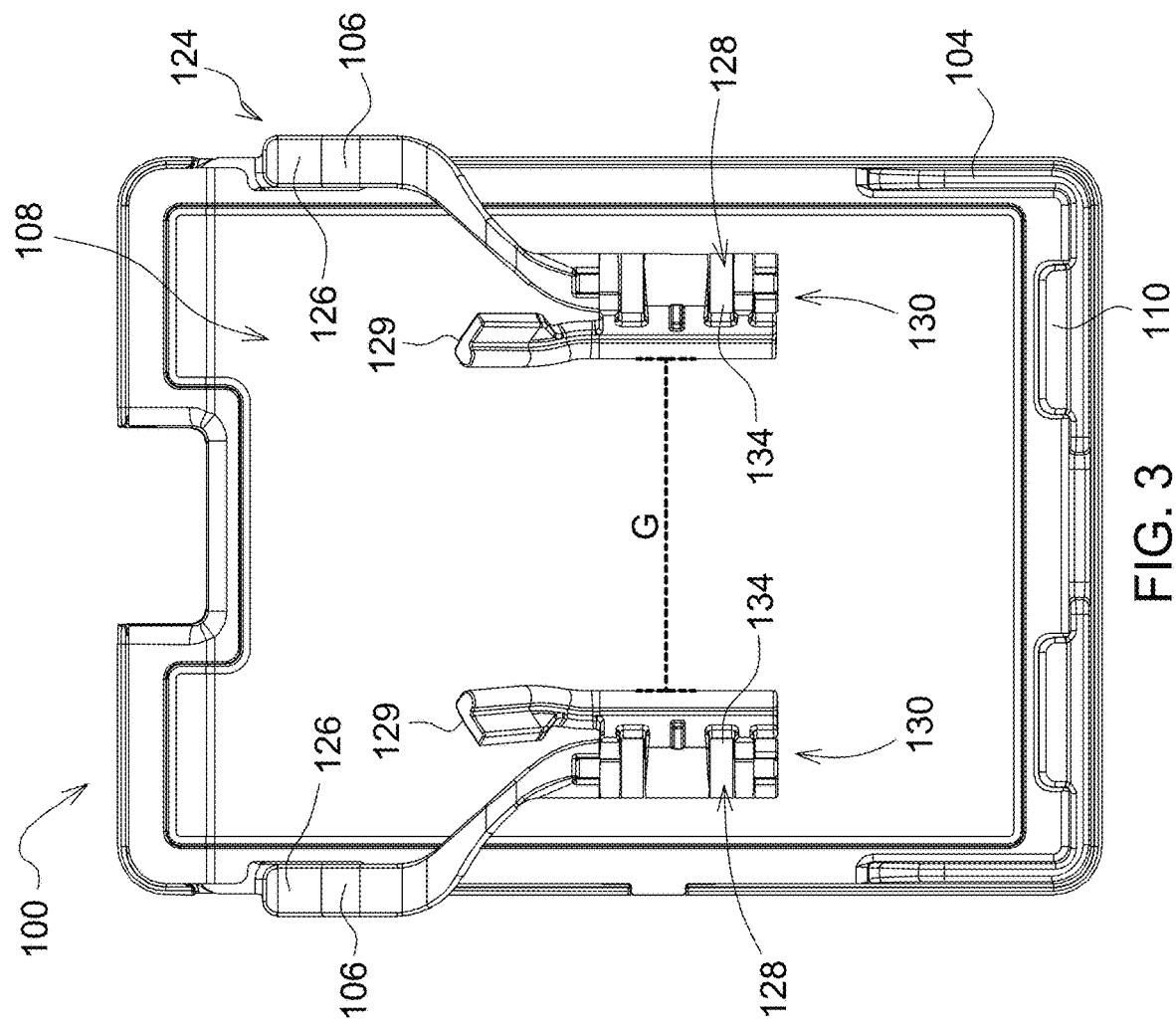
FIG. 3 is a front view of the mobile device holder of FIG. 1.

Turning now to FIG. 3, the one or more adjustable retaining arms 106 can extend from an upper portion 124 of the holder body 102, generally downwards towards the bottom support bracket 104 of the mobile device holder 100. As shown in FIG. 3, the one or more adjustable retaining arms 106 are attached to the holder body 102 at a mounting end portion 126, which in the case of examples having downwardly-extending adjustable retaining arms 106, is an upper end portion 126. It will be further understood that in, some examples, the one or more adjustable retaining arms 106 can be upwardly-extending adjustable retaining arms 106, and the mounting end portion 126 can be a lower end portion.

The one or more retaining arm assemblies 105 can also include an engagement feature 128, such as the gripper portions illustrated in FIGS. 1-4, positioned at a second end portion 130 of the retaining arm 106. Thus, in examples of the mobile device holder 100 having opposing first and second retaining arm assemblies 105, the first and second retaining arm assemblies can include first and second gripper portions connected respectively to the second end portion 130 of each of the first and second retaining arms 106. The engagement feature 128 can include a gripping surface 132, which may engage with one or more portions of a mobile device that is positioned within the adjustable enclosure 108, to retain the mobile device within the adjustable enclosure 108. While the illustrated example shows that the engagement feature 128 is an opposed pair of grippers which can pinch inwardly against the side of a mobile device, it will be understood that alternative engagement features 128 can be used in lieu of the grippers shown.

The engagement feature 128 can, according to some aspects of the present disclosure illustrated in FIGS. 1 and 3, be attached to the second end portion 130 of a corresponding adjustable retaining arm 106 by a hinge 134. The hinge 134 allows the engagement feature 128 to pivot around the second end portion 130 of the retaining arm 106 to which it is attached, so that the engagement feature 128 can be moved leftwards or rightwards as well as towards or away from the holder body 102. Advantageously, this allows the width of a gap, G (as shown in FIG. 3), between two opposing retaining arms 106, or between a retaining arm and a side wall 116 of the bottom support bracket 104 to be precisely adjusted by rotating the engagement feature 128 around the second end portion 130 of its corresponding retaining arm 106. Additionally, this combination of features allows the depth of the adjustable enclosure 108 to be adjusted by rotating the engagement feature 128 around the second end portion 130 on the hinge 134.

Figure 7A:
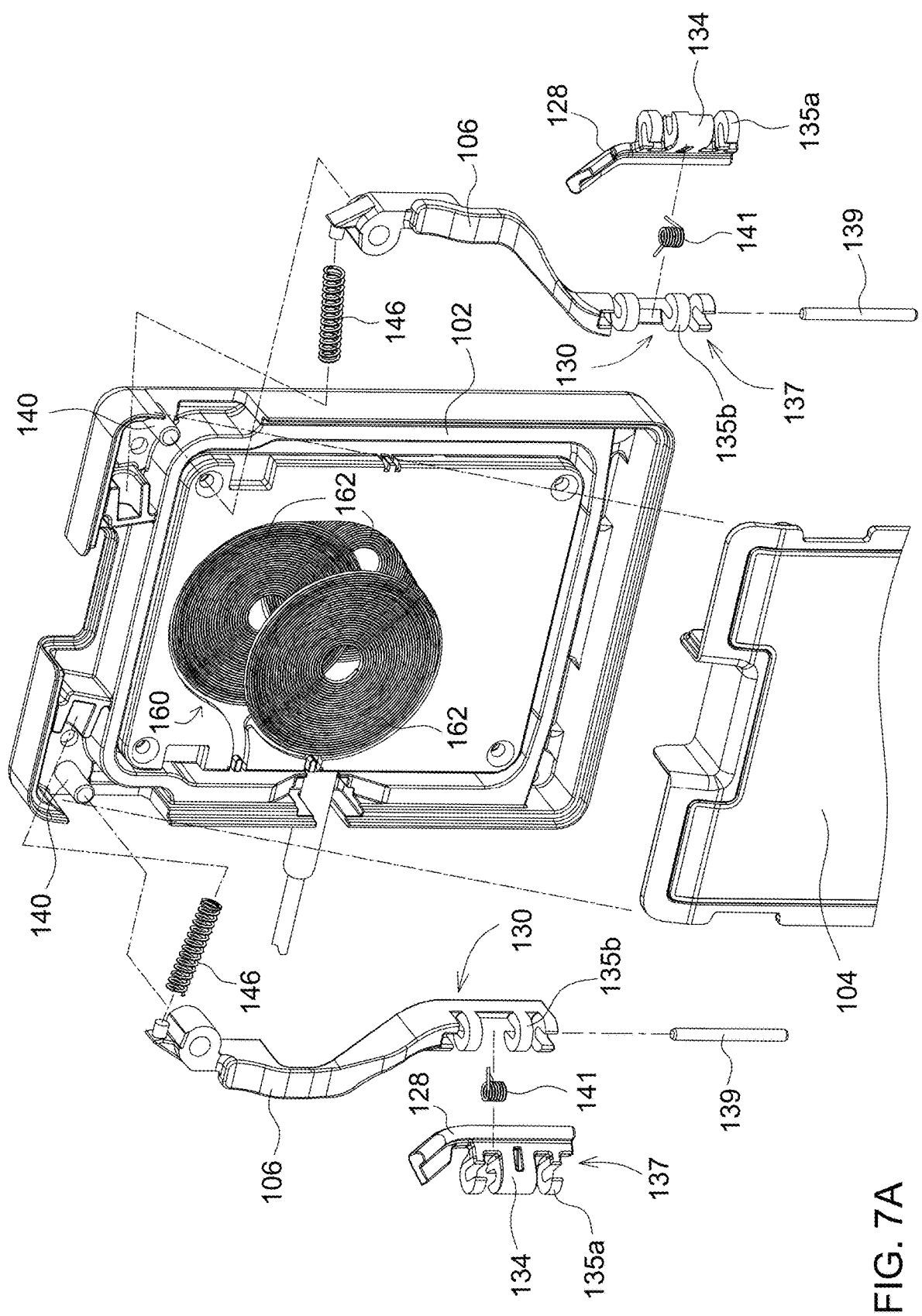
FIG. 7A is an exploded partial view of the mobile device holder of FIG. 1.

As shown in greater detail in FIG. 7A, the hinge 134 can be formed from a first hinge portion 135a attached to or integrally formed with the engagement feature 128, and a second hinge portion 135b attached to or integrally formed with the second end portion 130 of each of the one or more adjustable retaining arms 106. The first hinge portion 135a and the 135b can interconnect such that a channel 137 is formed extending axially through both the first hinge portion 135a and the second hinge portion 135b, as illustrated in FIG. 7A. The channel 137 can receive a post or pin 139, and the engagement feature 128 can move pivotally around the pin 139 (that is, around a pivot axis or rotation axis parallel to the pin 139) and either away from or towards the holder body 102.

According to one aspect of the present disclosure, illustrated in FIGS. 1 and 3, the engagement feature 128 can also include a slanted or angled receiver portion 129. The receiver portion 129 will catch a descending edge of a mobile device, as discussed in greater detail herein, and cause the engagement feature 128 to pivot on the hinge 134 away from the holder body 102. Thus, the engagement feature 128 can be positioned at a variable distance from the holder body 102 that accommodates mobile devices of varying thickness automatically upon the introduction of the mobile device to the adjustable enclosure 108.

In some examples, a radial biasing element 141 (such as the torsion spring 141) shown in FIG. 7A, can be positioned between the engagement feature 128 and the second end portion 130 of the corresponding retaining arm 106. The radial biasing element 141 can be positioned such that, as the engagement feature 128 pivots around the pin 139 and away from the holder body 102, it presses against the radial biasing element 141. Thus, in example mobile device holders 100 having laterally opposing first and second retaining arm assemblies 105, the first and second retaining arm assemblies 105 further comprise first and second gripper portion biasing springs that control or partially control the radial positioning of the gripper portions 128.

The radial biasing element 141 imparts a force that tends to return the engagement feature 128 towards the right side 120. That is, the engagement feature 128 can have a undeflected state (i.e., positioned towards or against the holder body 102) and a deflected state (i.e., positioned away from or further away from the holder body 102), and can pivotally move between the undeflected state and the deflected state. When moving to the deflected state under an external force, such as that imparted by inserting a mobile device into the adjustable enclosure 108, the engagement feature 128 presses against the radial biasing element 141. When the external force is removed, the radial biasing element 141 pushes against the engagement feature 128 and returns it to the undeflected state.

According to one aspect of the present disclosure, illustrated in FIGS. 1 and 4, the one or more adjustable retaining arms 106 can be attached to the holder body 102 at a rotatable joint 136 positioned at the mounting end portion 126 of the retaining arm 106. The rotatable joint 136 can also include a shoulder 150. As shown in FIG. 1, the shoulder 150 can be flush or substantially flush with the side of the holder body 102 to which the adjustable retaining arm 106 is attached, when the adjustable retaining arm 106 is in the laterally flush position, and deflects inward into a cavity in the holder body 102 as the adjustable retaining arm 106 is moved from the laterally flush position to the laterally deflected position.

Figure 7B:
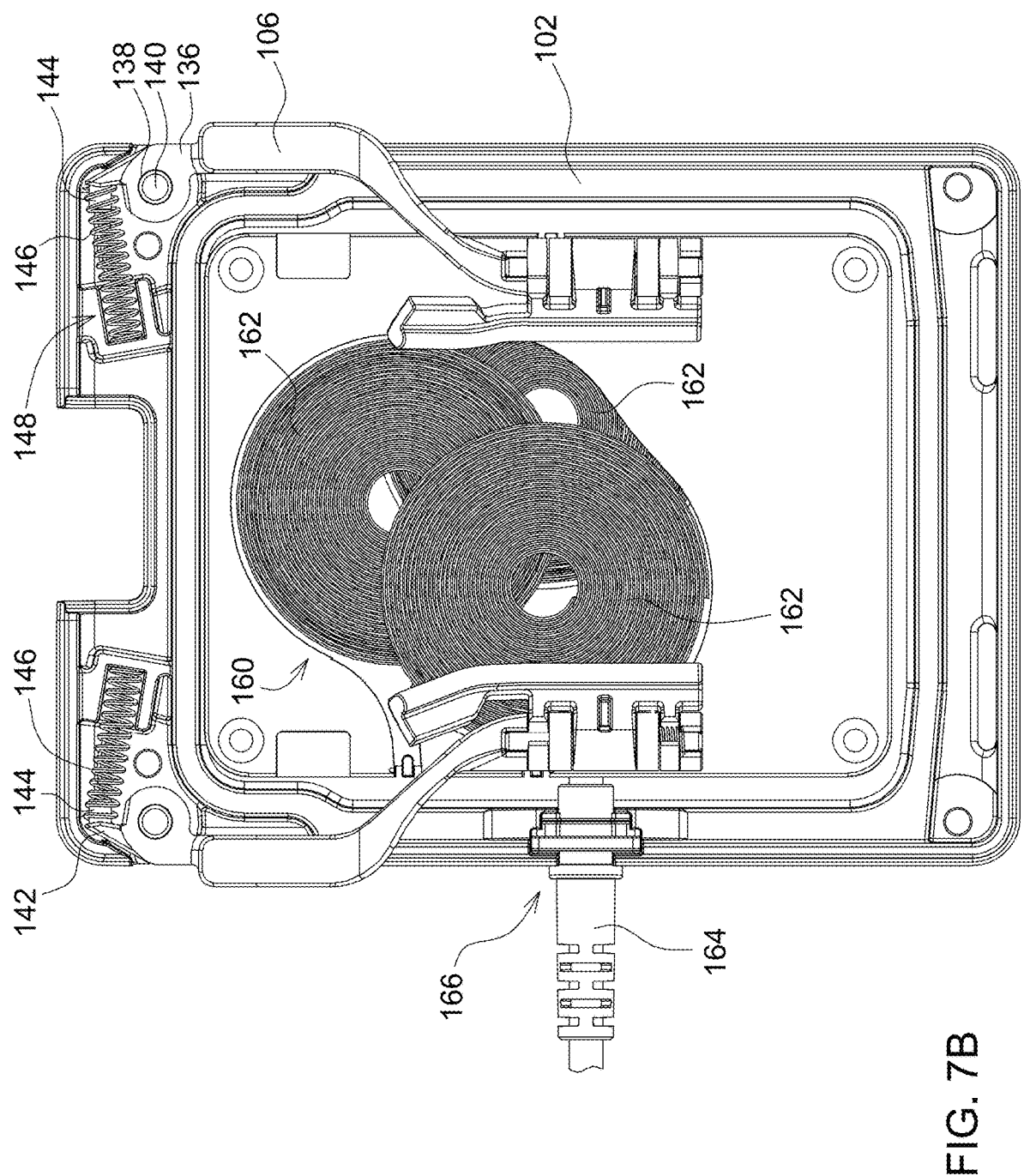
FIG. 7B is a partial cutaway front view of a mobile device holder according to one aspect of the present disclosure.

As shown in greater detail in FIG. 7B, which depicts a cutaway view of the holder body 102 and various components of the mobile device holder 100, the rotatable joint 136 can comprise an annular pivot 138, which receives a corresponding pivot post 140 that is formed on an internal surface (that is, enclosed within a housing) of the holder body 102, to pivotably connect the one or more adjustable retaining arms 106 to the holder body 102.

The one or more adjustable retaining arms 106 can be rotated laterally around the corresponding pivot post 140. Thus the adjustable retaining arms 106 can rotate around a pivot axis or rotation axis extending parallel to the corresponding pivot post 140, and transverse relative to the holder body 102. This moves the adjustable retaining arm 106 from a laterally flush position (that is, a substantially closed configuration of the one or more adjustable retaining arms 106) to a laterally displaced position (that is, a deflected configuration of the one or more adjustable retaining arms 106), by pulling or pushing outwards (that is, left for an adjustable retaining arm 106 positioned on the left side of the holder body 102 and right for an adjustable retaining arm 106 positioned on the right side of the holder body 102) on a retaining arm 106. This causes the annular pivot 138 to rotate around the corresponding pivot post 140. It will be appreciated that, in examples with laterally opposing adjustable retaining arms 106 positioned on opposite sides of the holder body 102, the first and second retaining arms 106 are rotatable around first and second pivot axes extending parallel to first and second posts 140. In such examples, the pivot axes around which the grippers 128 rotate may be referred to as third and fourth pivot axes, and are transverse to the first and second pivot axes.

When the one or more adjustable retaining arms 106 are pulled laterally outwards relative to the holder body 102, the width of the gap, G, described above, increases. Accordingly, the mobile device holder 100 can be adjusted to accommodate mobile devices of differing widths by rotating the one or more adjustable retaining arms 106 outwards relative to the holder body 102.

As shown in FIG. 7B, the one or more adjustable retaining arms 106 can also include a projection 142 that extends past the annular pivot 138 on a side opposite the portion of the corresponding retaining arm 106 which extends out of the holder body 102. The projection 142 can comprise a post 144 that receives one end of a lateral biasing element 146 (for example, a biasing spring like the compression spring shown in FIG. 7B). The other end of the lateral biasing element 146 can connect to a corresponding portion of the holder body 102. For example, as shown in FIG. 7B, the other end of the lateral biasing element 146 can be received in a slot or bore 148 formed in the holder body 102. Thus, in example mobile device holders 100 having first and second laterally opposing first and second retaining arm assembles, the mobile device holder 100 can include first and second retaining arm biasing springs 146.

When the adjustable retaining arm 106 is rotated away from the holder body 102 as previously discussed, the pivotal motion of the annular pivot 138 around the corresponding pivot post 140 will bring the projection 142 (and therefore the post 144) closer to the bore 148, which will compress the lateral biasing element 146. The lateral biasing element 146 will therefore apply an opposing force to the projection 142, which will tend to urge the adjustable retaining arm 106 to return to its original position. When a mobile device is retained in the adjustable enclosure 108, this opposing force will urge the engagement feature 128, and in particular, the gripping surface 132 of the engagement feature 128 into contact with the mobile device, thus retaining the mobile device either between two opposing adjustable retaining arms 106, or between an adjustable retaining arm 106 and a side wall 116 of the bottom support bracket 104, by resiliently biasing the one or more adjustable retaining arms 106 inwards against the mobile device, or towards each other in examples having two opposing adjustable retaining arms.

While FIG. 7B shows an adjustable retaining arm 106 having a projection 142 with a post 144 that opposes a slot or bore 148 with a lateral biasing element 146 that is a compression spring extending between the post 144 and the bore 148, it will be appreciated that alternative configurations are possible. For example, instead of a lateral biasing element 146 extending diagonally inward from the projection 142 to the bore 148, the mobile device holder 100 could include a tension spring extending diagonally outward from the projection 142 to an exterior corner of the holder body 102. It will be appreciated that other lateral biasing elements 146 can also be used in various alternative aspects of the present disclosure.

As can be seen in FIGS. 1 and 3, the combination of the holder body 102, the bottom support bracket 104 and the one or more adjustable retaining arms 106 define the boundaries of the adjustable enclosure 108. As seen in FIGS. 1 and 3, the adjustable enclosure 108 is open from the top, bounded to the rear by the holder body 102, bounded on the sides, front, and bottom by the bottom support bracket 104 and the one or more adjustable retaining arms 106. Thus, a mobile device can be introduced to the adjustable enclosure 108 through the open top space and secured within the adjustable enclosure 108 by the bottom support bracket 104 and the one or more adjustable retaining arms 106.

According to one aspect of the present disclosure, the mobile device holder 100 can also include a wireless charger, which can, in some examples, be included in the holder body 102. For example, in the cutaway view of the holder body 102 shown in FIG. 7B, a wireless charger 160 comprising one or more inductive coils 162 can be positioned towards a center portion of the holder body 102. In such examples, the wireless charger 160 can be integrally formed with the holder body 102 to form a unitary component.

The wireless charger 160 can be configured such that at least one of the inductive coils 162 is positioned to align with a corresponding inductive coil in a mobile device, such as mobile device 200, when the mobile device is secured in the adjustable enclosure 108. As shown in FIG. 7B, the wireless charger 160 can include multiple inductive coils 162, with each positioned differently so that at least one inductive coil 162 will be correctly aligned to charge a variety of wireless devices (such as specific models of cellular phones or tablets), which may include a differently positioned corresponding internal inductive coil for wireless charging.

The wireless charger 160 can be powered by an external power cable 164. 164 can be connected to the wireless charger 160 through a port, such as a port 166 shown in the left side of the holder body 102 illustrated in FIG. 7B. The port 166 can include an electrical connector (not shown) which allows the external power cable 164 to be in electrical communication with (and thus to power) the wireless charger 160. In some examples, the external power cable 164 can be connected to an electrical outlet in the cabin of a work vehicle, such that the wireless charger 160 of the mobile device holder 100 draws power from the work vehicle. Advantageously, in such examples, this combination of features allows the mobile device holder 100 to also function as a charging station for a mobile device, when the mobile device is secured in the adjustable enclosure 108.

Figure 5:
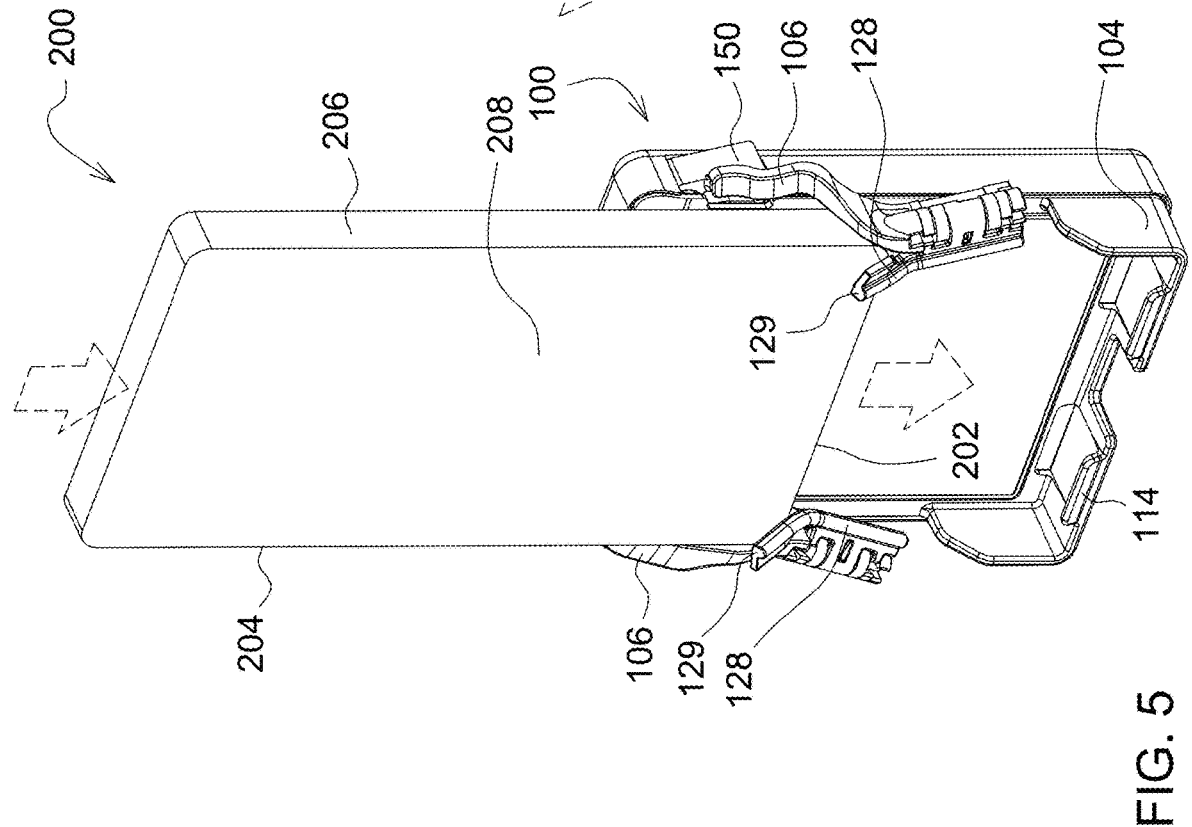
FIG. 5 is a schematic showing the insertion of a mobile device into a mobile device holder according to one aspect of the present disclosure.

According to one aspect of the present disclosure, as illustrated in FIG. 5, a mobile device 200 can be introduced to the mobile device holder 100 having two adjustable retaining arms 106. The mobile device 200 can be introduced downwards from an open top end portion of the mobile device holder 100, between the adjustable retaining arms 106 and into the adjustable enclosure 108.

As the mobile device 200 is introduced between the adjustable retaining arms one or more adjustable retaining arms 106, the adjustable retaining arms 106 are forced laterally apart. The mobile device 200 impinges on the receiver portion 129 of the engagement feature 128 of each of the adjustable retaining arms 106 and causes each of the engagement features 128 to rotate around its corresponding hinge 134 and away from the holder body 102, and against its corresponding radial biasing element 141. Thus, the width and depth of the adjustable enclosure 108 is automatically adjusted to accommodate the introduction of the mobile device 200.

The mobile device 200 is then more fully introduced to the adjustable enclosure 108 until a bottom edge 202 (that is, the leading edge) of the mobile device 200 impinges on the lower portion 112 of the bottom support bracket 104, at which point downward motion of the mobile device 200 is stopped by the bottom support bracket 104, with the bottom edge 202 secured by the one or more guides 114. With the mobile device 200 fully inserted into the adjustable enclosure 108, the one or more adjustable retaining arms 106 press in against a left side 204 and a right side 206 of the mobile device 200, urged inwards by the force applied by the lateral biasing element 146, and the engagement features 128 apply a retaining force against a front side 208 of the mobile device 200 to keep the mobile device 200 retained against the holder body 102.

Because the mobile device 200 is engaged only along the bottom edge 202, the left side 204, and the right side 206, there is no obstruction of the screen of the mobile device 200 by any component of the mobile device holder 100.

Figure 6:
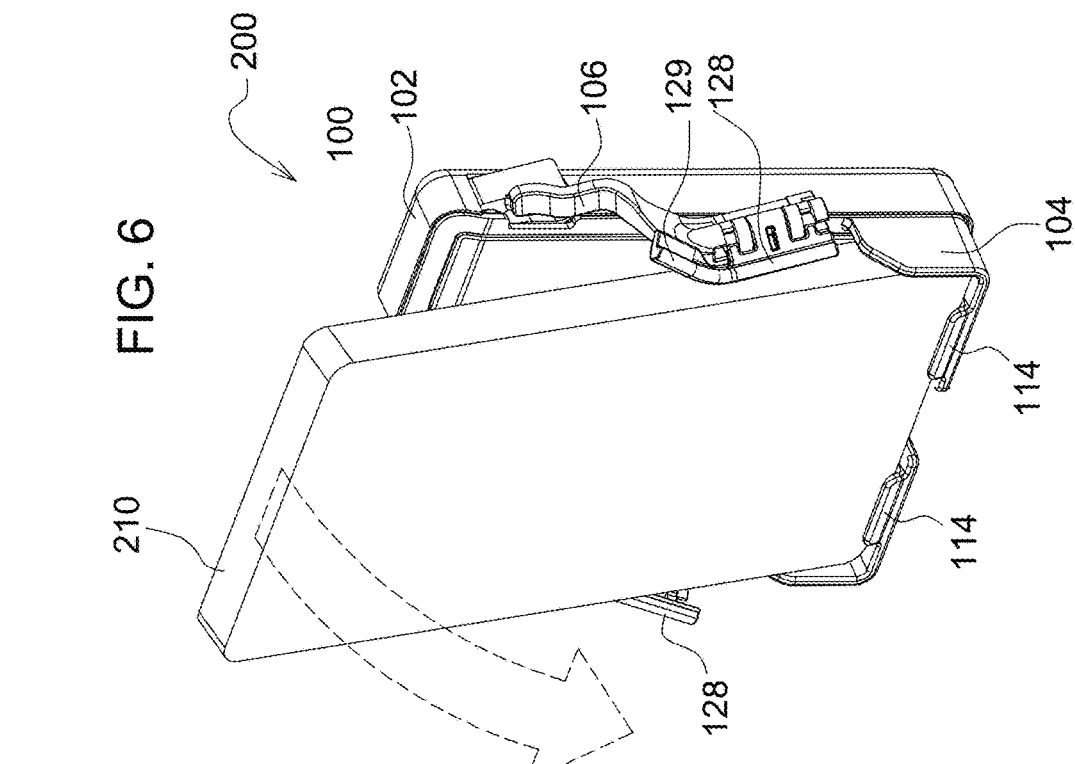
FIG. 6 is a schematic showing the removal of a mobile device from the mobile device holder of FIG. 5.

According to one aspect of the present disclosure, the mobile device 200 can be removed from the adjustable enclosure 108 of the mobile device holder 100 by pulling forward on a top edge 210 of the mobile device 200, as illustrated in FIG. 6. As the mobile device 200 is pulled forward, it presses against the engagement feature 128 on each of the one or more adjustable retaining arms 106 and pushes the engagement feature 128 forward and away from the mobile device 200 to the sides as the engagement feature 128 pivots around the hinge 134.

The forward pull against the mobile device 200 also causes the mobile device 200 to slide forward away from the one or more adjustable retaining arms 106. For instance, in the example illustrated in FIG. 6, the mobile device 200 is pulled out from between the opposing retaining arms 106 as it comes free of the corresponding engagement features 128. Once the mobile device 200 is pulled out of engagement with the one or more adjustable retaining arms 106, the lateral biasing element 146 will return the one or more adjustable retaining arms 106 to the original, undeflected position.

As the mobile device 200 is pulled free of the one or more adjustable retaining arms 106 and the engagement feature 128, it will also tilt forward until the bottom edge 202 comes free of the one or more guides 114. With the mobile device 200 no longer restrained by the one or more adjustable retaining arms 106 and the corresponding engagement features 128, or by the one or more guides 114, it can also come free of the bottom support bracket 104 and thereby exit the adjustable enclosure 108. When no mobile device, such as mobile device 200 is contained in the enclosure, the biasing elements discussed herein can return the retaining assembly to the original, undeflected position.

Thus, with the combination of features in the various aspects described above, a mobile device, such as mobile device 200, can be introduced to the adjustable enclosure 108 of the mobile device holder 100 and removed therefrom by a user using only one hand, with the mobile device 200 secured in the adjustable enclosure 108 of the mobile device holder 100 by the one or more adjustable retaining arms 106 and the bottom support bracket 104 until the user is ready to remove the mobile device 200 from the adjustable enclosure 108.

Figure 8:
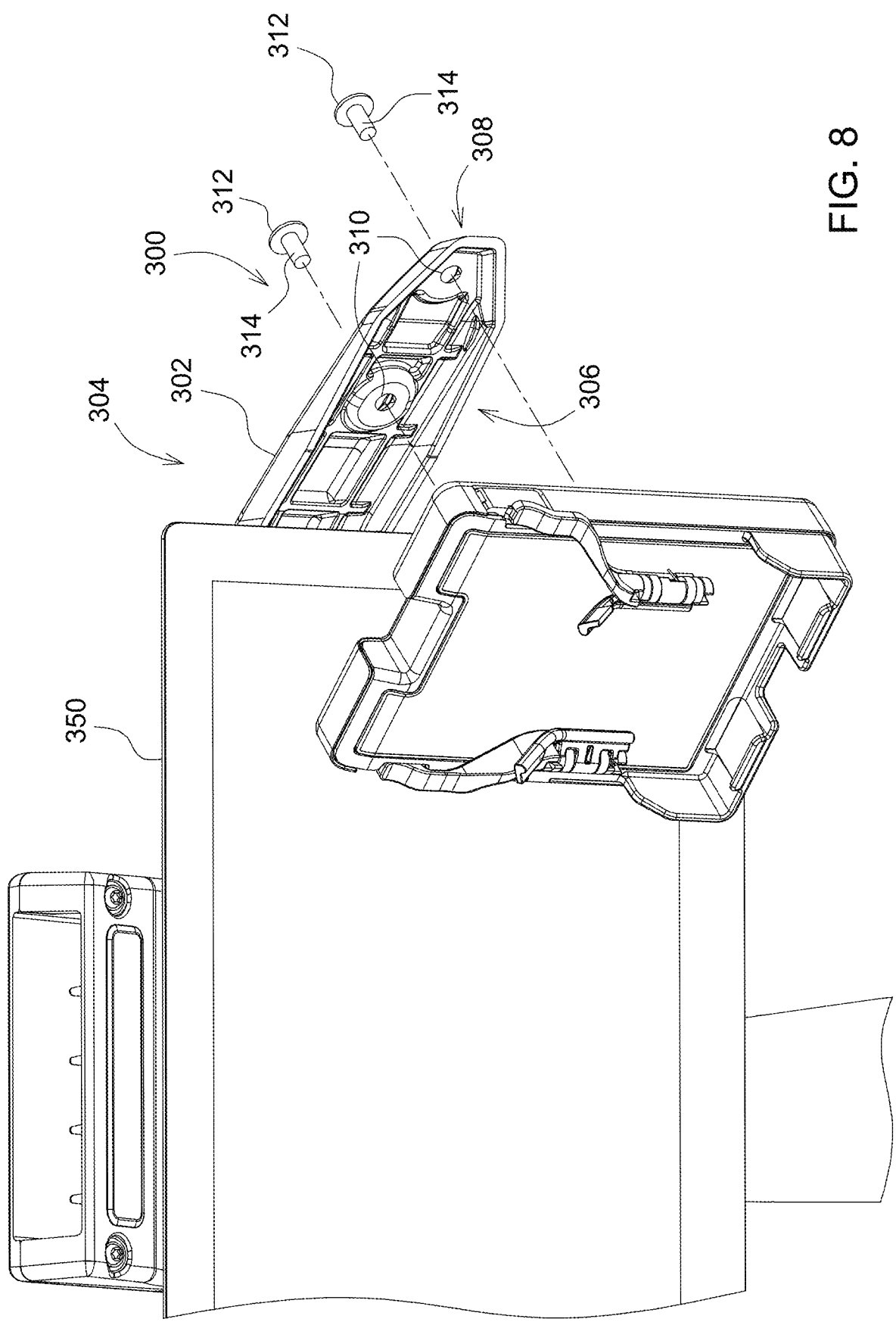
FIG. 8 is an exploded view of a mounting system for a mobile device holder according to one aspect of the present disclosure.

According to one aspect of the present disclosure, the mobile device holder 100 (and any mobile device retained in the adjustable enclosure 108 of the mobile device holder 100) can be mounted to a feature inside the cabin of a vehicle, such as a work vehicle, by a mounting device, such as the mounting arm 300 illustrated in FIG. 8. As shown in FIG. 8, the mounting arm 300 can comprise a lateral member 302, which can be mounted at a first end portion 304 to a feature on the control display 350.

The mounting arm 300 can also include a mounting feature 306 positioned towards a second end portion 308 of the lateral member 302. For example, as illustrated in FIG. 8, the mounting feature 306 can comprise one or more apertures 310 and a corresponding number of securing bolts 312 that extend through the apertures and connect with one or more corresponding features on a back side of the holder body 102 (for example, the mount 168, shown in FIG. 4), which can have corresponding channels or bores which receive a shaft portion 314 of the bolts 312.

Figure 9:
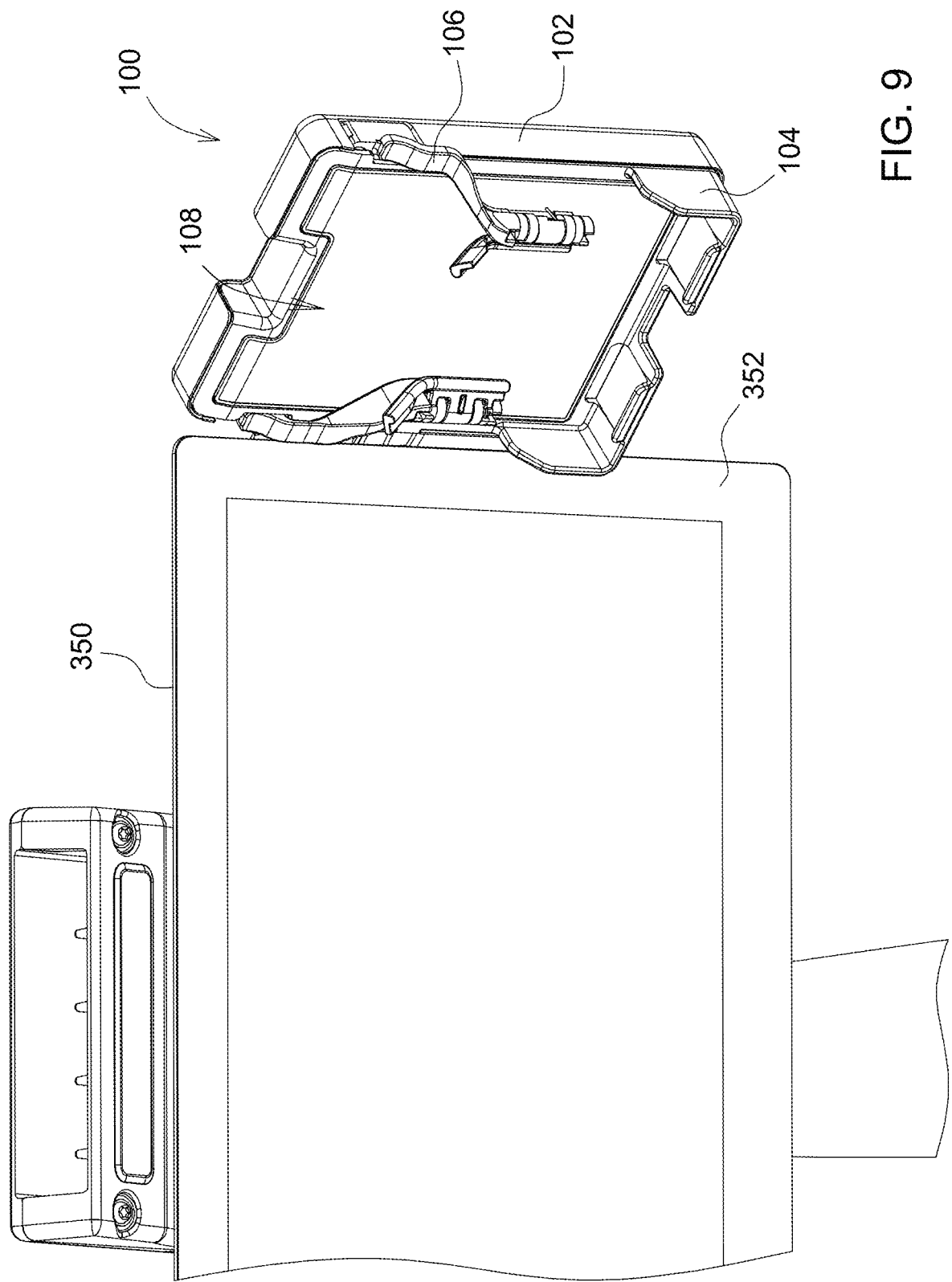
FIG. 9 is a perspective view of a mobile device holder according to one aspect of the present disclosure mounted on the mounting system of FIG. 8.

Thus, the mobile device holder 100 can be mounted to the second end portion 308 of the lateral member 302, and the first end portion 304 of the lateral member 302 can be attached to a feature inside the cabin of the work vehicle to mount the mobile device holder 100 (and thus any mobile device retained within the adjustable enclosure 108 of the mobile device holder 100) to a stationary location within the cabin of the work vehicle, such as to a right side portion 352 of the control display 350, as illustrated in FIG. 9.

According to one aspect of the present disclosure, the mounting arm 300 can also be adjustable. For example, the lateral member 302 can comprise a telescoping component that allows the length of the lateral member 302 to be adjusted. Additionally or alternatively, the mounting arm 300 can be mounted to the control display 350 or the display arm 404 on a swiveling or pivoting mount (not shown), which allows the mobile device holder 100 and thus the mobile device 200 retained in the adjustable enclosure 108 of the mobile device holder 100 to be adjusted in one, two, or three dimensions relative to the control display 350. Advantageously, such a combination of features allows for adaptable, one-handed repositioning of the mobile device holder 100 and the mobile device 200 depending on the location of the mobile device holder 100 and the mobile device 200 preferred by the user (i.e., the vehicle operator).

Figure 10:
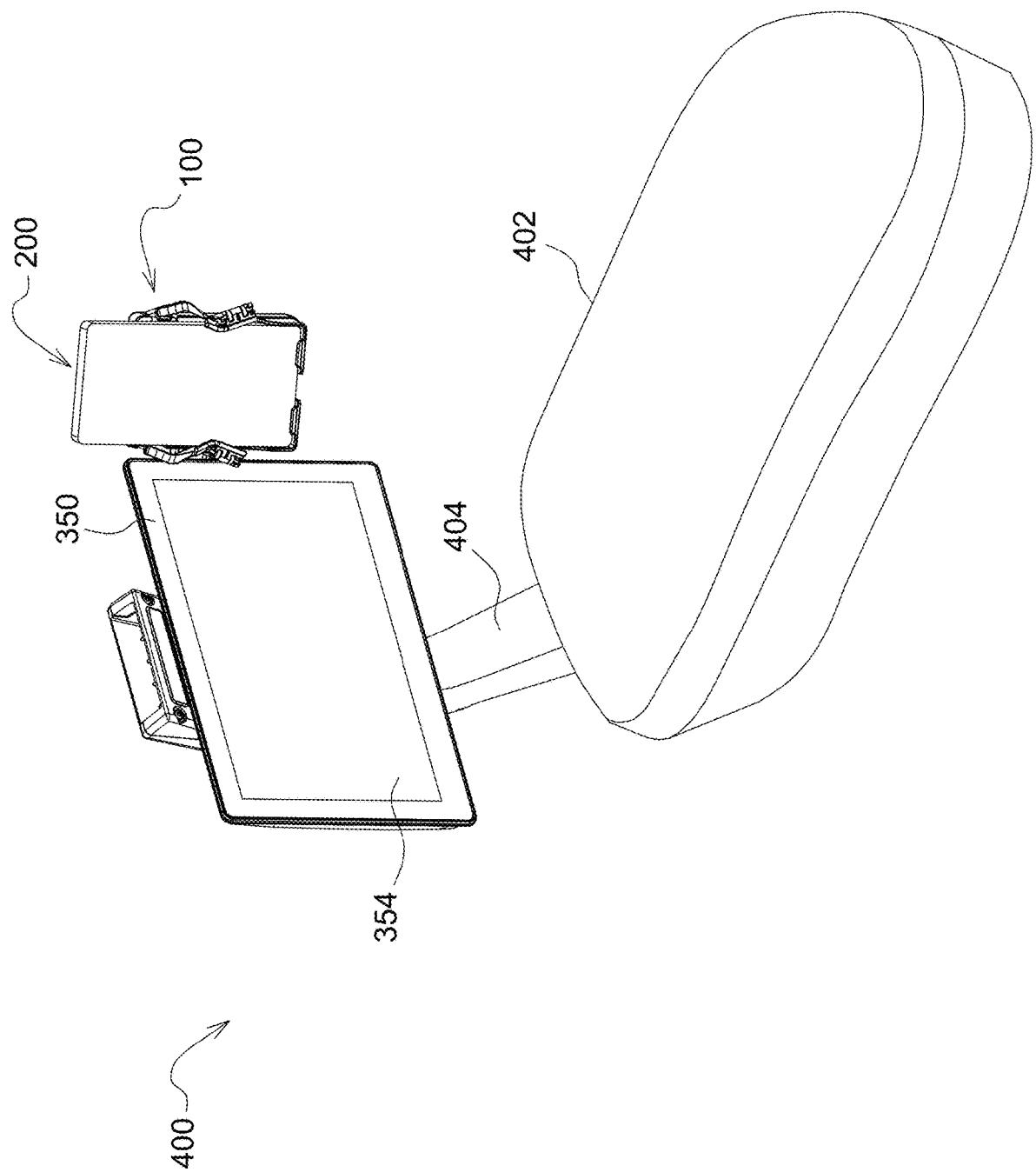
FIG. 10 is a conceptual perspective view of a control assembly and a mobile device holder according to one aspect of the present disclosure mounted to the control assembly.

Turning now to FIG. 10, a control assembly 400 can include a control display 350 attached to a console 402, by a display arm 404 which extends vertically from the console 402. The mounting arm 300 (as shown in FIG. 8) can extend from the control display 350 or from the display arm 404, and can support the mobile device holder 100. The mobile device holder 100 can contain the mobile device 200, which is supported adjacent to the control display 350. Thus, the mobile device 200 and the control display 350 can be positioned such that the screens of both are simultaneously visible to a user positioned to the lefthand side of the control assembly 400, such as an operator seated in a working vehicle having a cabin that contains the control assembly 400.

Advantageously, the mobile device 200 can be introduced to and/or removed from the mobile device holder 100 with one hand and can be viewed and utilized without any need for the user to shift position, or to move the mobile device holder 100 or the mobile device 200. Furthermore, the positioning of the mobile device holder 100 (and therefore any mobile device 200 contained within the mobile device holder 100) can be arranged such that a user can view the viewscreen of the mobile device 200 as well as a viewscreen 354 of the control display 350 with no adjustments or only minor adjustments of the user's field of view.

It will be appreciated that, while FIG. 10 depicts the mobile device holder 100 (and therefore the mobile device 200 retained in the adjustable enclosure 108 of the mobile device holder 100) positioned at the end of the mounting arm 300 extending to the right hand side of the control display 350, in order to accommodate an operator seated to the left of the control assembly 400, in another example, the mobile device holder 100 can instead be positioned at the end of the mounting arm 300 extending to the left hand side of the control display 350, which may be convenient if the vehicle operator is seated to the right of the control assembly 400. It will also be appreciated that, in some examples, the mounting arm 300 can be positioned so that the mobile device holder 100 and the mobile device 200 are positioned above the control display 350.

It will be appreciated by one of skill in the art that solutions alternative to the mounting arm 300 for mounting the mobile device holder 100 to an interior portion of a cabin of a work vehicle are possible, based on the desired mounting location, proximity to or distance from, the control display 350 of the mobile device holder 100 and the mobile device 200. For instance, merely as an illustrative example, the mobile device holder 100 can be mounted directly to an edge portion of the control display 350 by a clip or clamp that can be dismounted, moved, and remounted as needed by the vehicle operator.

Also disclosed herein are example mobile device holders with a retaining device comprising two interlocked and opposing retaining arms, as shown in FIGS. 11-15.

Figure 11:
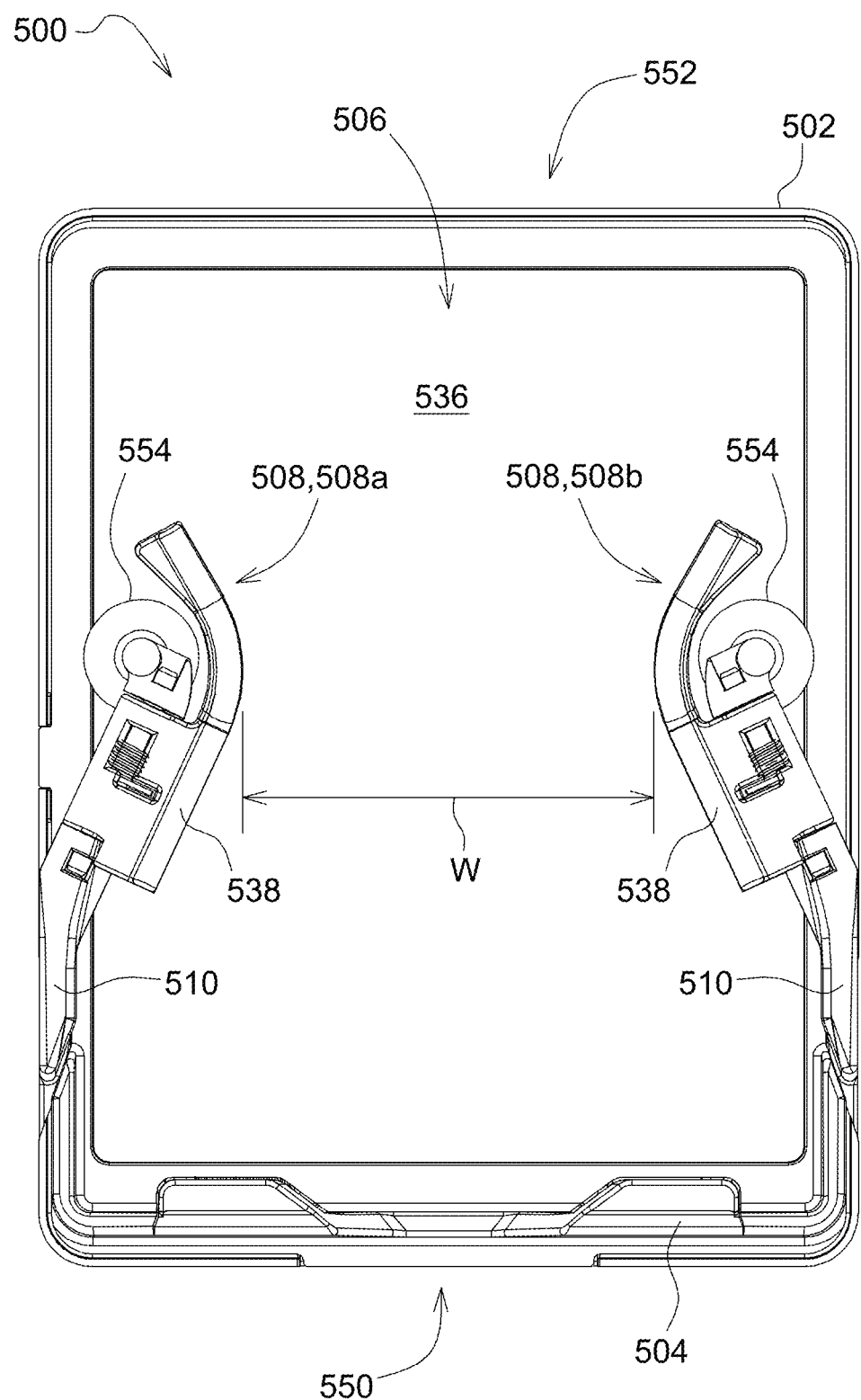
FIG. 11 is a front view of a mobile device holder according to one aspect of the present disclosure, with retaining arms in a retracted configuration.

FIG. 11 shows a mobile device holder 500 according to one aspect of the present disclosure. The mobile device holder 500 may include features that are common with the mobile device holder 100 previously described, except for the differences discussed herein. For example, the mobile device holder 500 includes a holder body 502 and a bottom support bracket 504 that together partially form an adjustable enclosure 506, similar to the holder body 102 and the bottom support bracket 104 of the mobile device holder 100.

The mobile device holder 500 also includes one or more retaining arm assemblies 508. For example, the mobile device holder 500 shown in FIGS. 11-15 includes a first retaining arm assembly 508a and a second retaining arm assembly 508b, which are laterally opposed to each other and further define the adjustable enclosure 506.

As shown in FIG. 11, the one or more retaining arm assemblies 508 can each comprise a retaining arm 510, which extends from the holder body 502. As illustrated in detail in FIGS. 13 and 15, a retaining arm 510 according to one aspect of the present disclosure can include a mounting end portion 512, a free end portion 514, and a retaining arm member 516 extending between the mounting end portion 512 and the free end portion 514.

Figure 15:
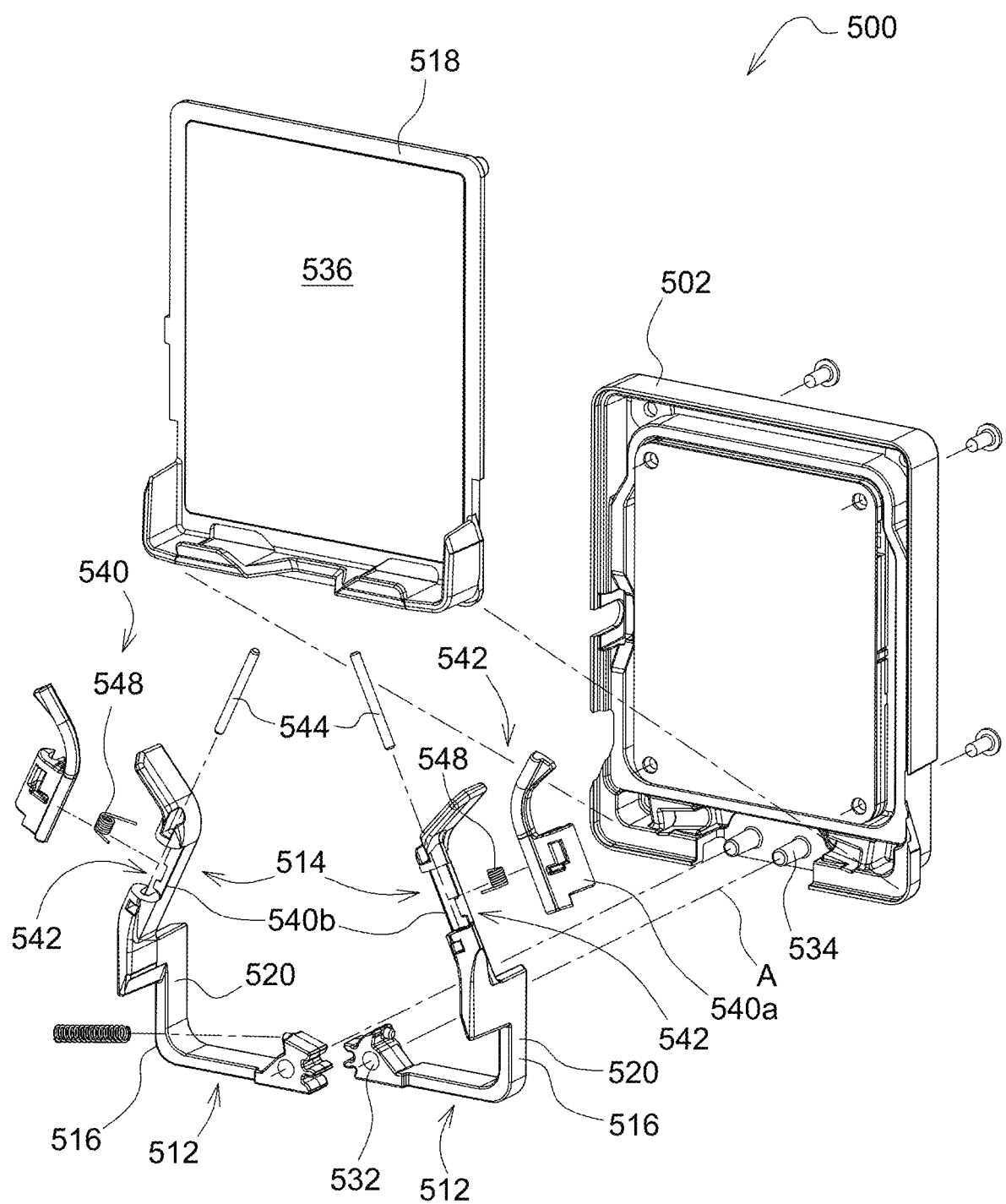
FIG. 15 is an exploded view of the mobile device holder of FIG. 12.

According to one aspect of the present disclosure, the holder body 502 can also include a faceplate 518, as shown in FIG. 15. In such examples, the retaining arm 510 can extend from behind the faceplate 518 to in front of the faceplate 518. More particularly, the mounting end portion 512 of the retaining arm 510 can be positioned behind the faceplate 518. The retaining arm member 516 can include a forwardly extending portion 520 that extends forward past a front face of the faceplate 518, such that a portion of the retaining arm 510 and the free end portion 514 are positioned forward of the faceplate 518. It will be appreciated, however, that in some examples, the entirety of the retaining arm 510 can be positioned forward of the faceplate 518.

Figure 12:
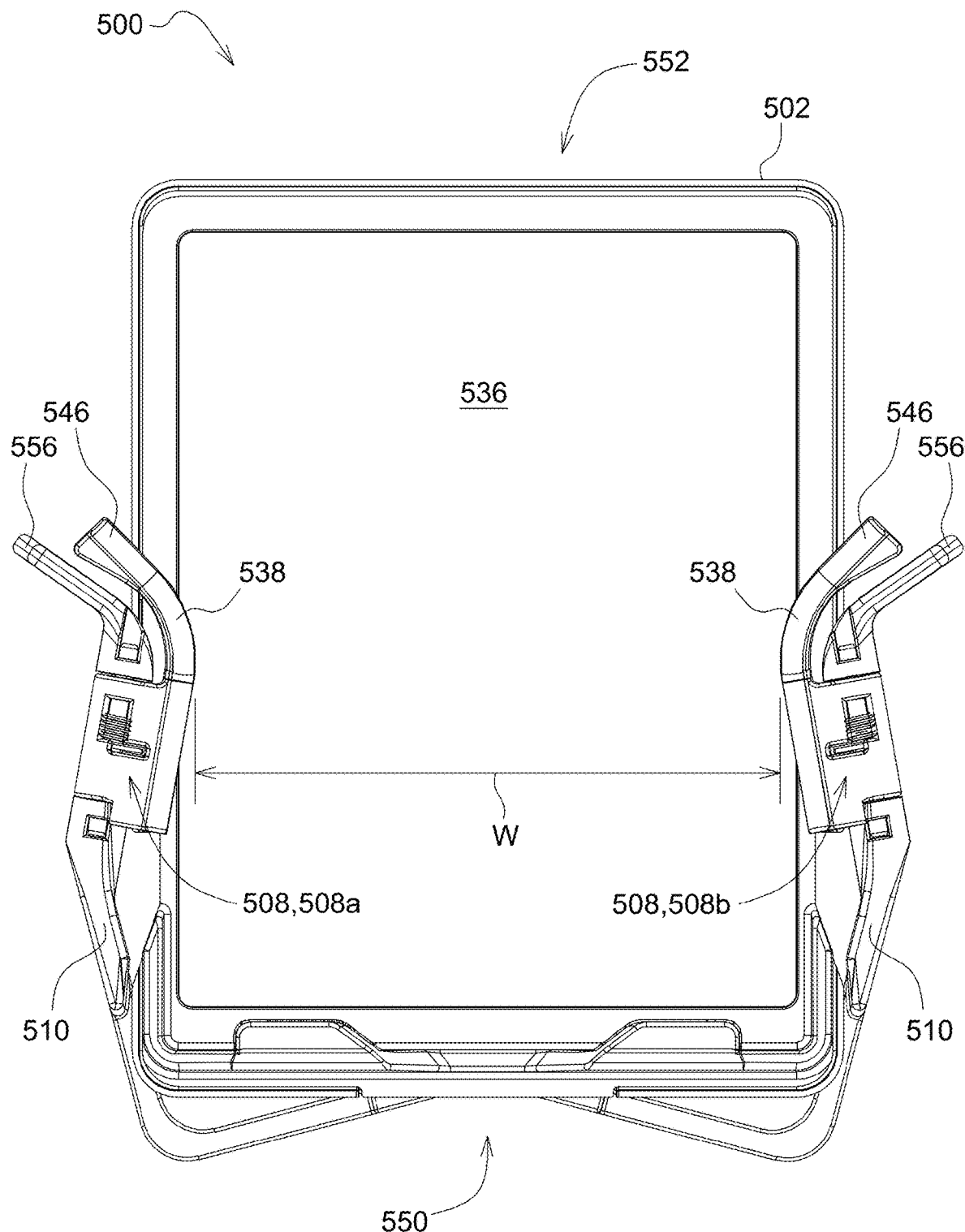
FIG. 12 is a front view of a mobile device holder according to another aspect of the present disclosure, with retaining arms in a retracted configuration.
Figure 13:
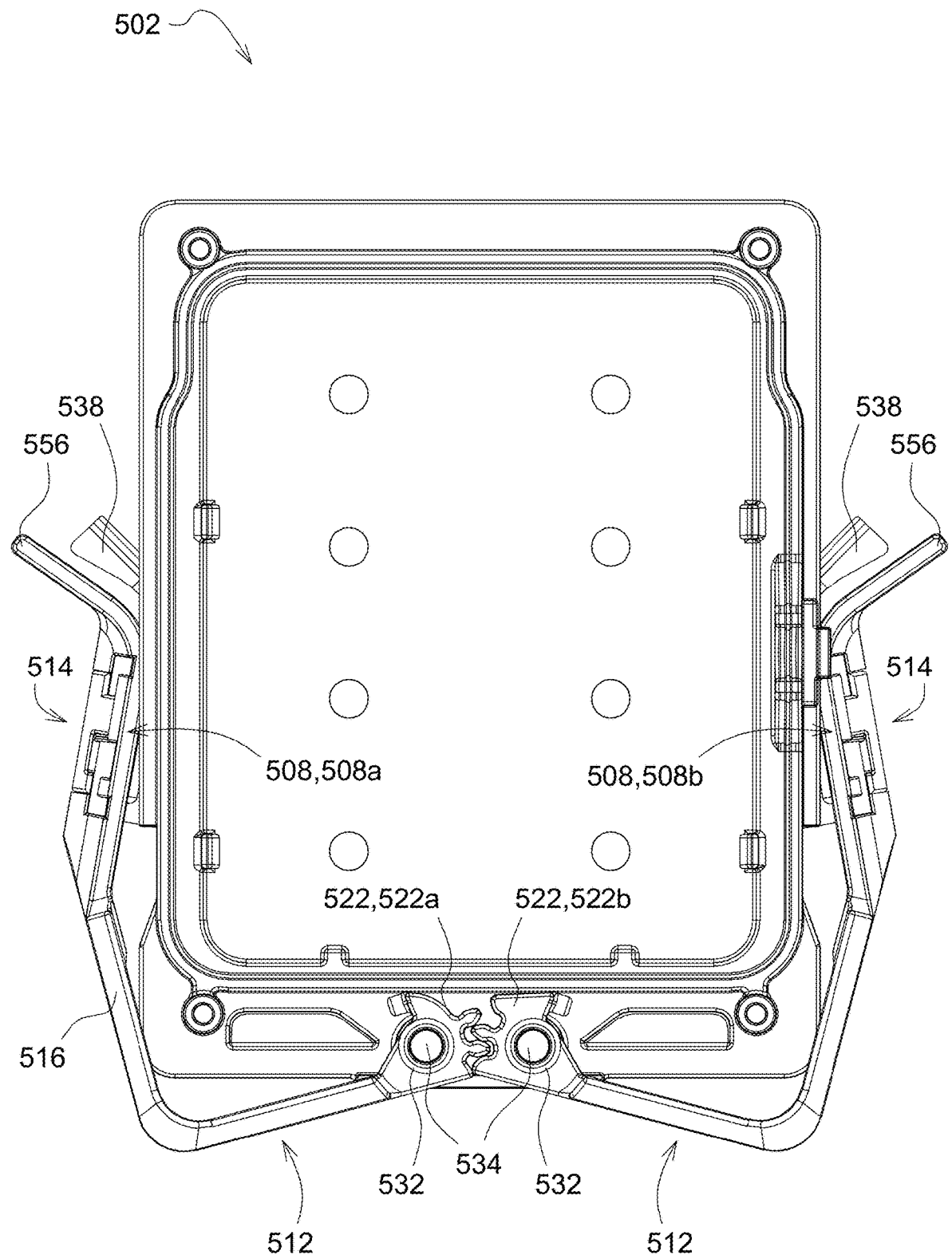
FIG. 13 is a front cutaway view of the mobile device holder of FIG. 12.

As shown in FIGS. 13 and 15, the retaining arm 510 can be attached to the holder body 502 at the mounting end portion 512. For example, the mounting end portion 512 can include an aperture 532 that receives a pivot post 534. This arrangement of features rotatably connects the retaining arm 510 to the holder body 502 of the mobile device holder 500. For example, the retaining arms 510 can rotate laterally around the corresponding pivot post 534 to which it is attached. Thus, each retaining arm 510 can rotate around a pivot axis or rotation axis (designated in FIG. 15 by the character A) extending parallel to the corresponding pivot post and transverse relative to a surface 536 of the faceplate 518. Accordingly, this allows for the retaining arms 510 to be moved from a laterally retracted position, where a spacing, W, between the retaining arms 510 is at a minimum or substantial minimum, as shown in FIG. 11, to a laterally extended position, where the spacing W is increased, as shown in FIG. 12.

Figure 14:
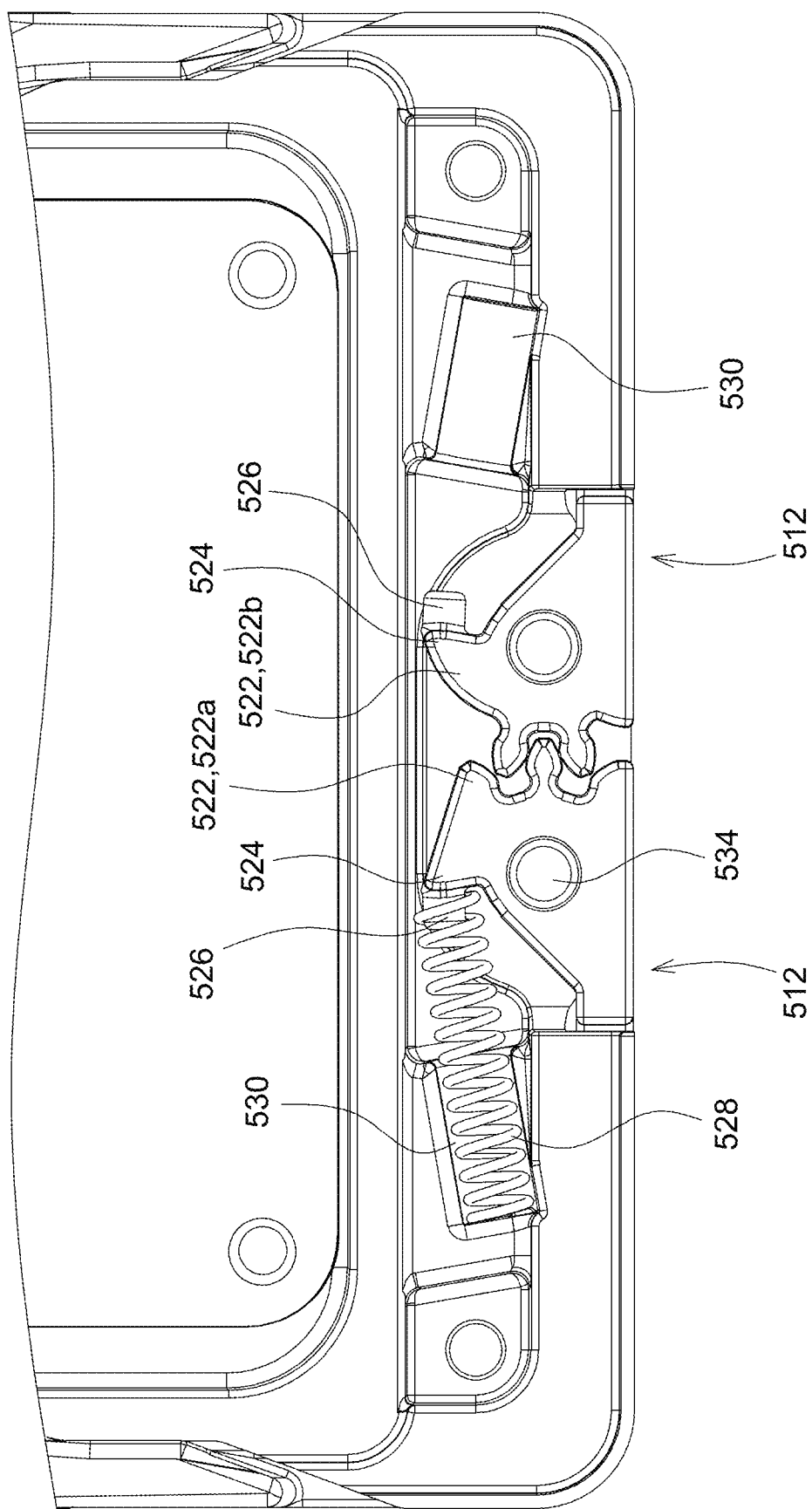
FIG. 14 is a close front cutaway view of the bottom portion of the mobile device holder of FIG. 12.

With reference to FIGS. 13 and 14, the mounting end portion 512 of the retaining arms 510 can comprise a gear portion 522, which is disposed around the 520. When the mobile device holder 500 comprises two laterally opposed retaining arm assemblies 508, such as in the example shown in FIGS. 11-15, a first retaining arm 510a can comprise a first gear portion 522a, and the second retaining arm 510b can comprise a second gear portion 522b. According to one aspect of the present disclosure, the first gear portion 522a and the second gear portion 522b can interlock, as shown in FIGS. 13 and 14.

In such examples, the movement of the first retaining arm 510a and the second retaining arm 510b are coupled, such that when the first retaining arm 510a moves from the laterally retracted position to the laterally extended position (as shown in FIGS. 11 and 12), the interaction of the first gear portion 522a and the second gear portion 522b correspondingly moves the second retaining arm 510b from the laterally retracted position to the laterally extended position, or vice versa. Advantageously, this ensures that the retaining arm assemblies 508 open symmetrically, ensuring that a mobile device introduced to the adjustable enclosure 506 is centered within the mobile device holder 500.

As shown in FIGS. 13 and 14, the retaining arms 510 can also include a projection 524 that extends past the 518 on the mounting end portion 512 of the retaining arm 510. The projection 524 includes a post 526 that receives one end of a lateral biasing element 528 (for example, a biasing spring like the compression spring shown in FIG. 14). The other end of the lateral biasing element lateral biasing element 528 can be received in a slot or bore 530, in a similar fashion to the arrangement of the lateral biasing element 146, the bore 148, and the post 144 previously introduced in relation to the mobile device holder 100. It will be appreciated that, while the example depicted in FIG. 14 shows a single lateral biasing element 528 extending between the post 526 and the bore 530, in some examples, the mobile device holder 500 can include a second lateral biasing element lateral biasing element 528, such that each one or more retaining arm assemblies 508 has a lateral biasing element 528 disposed between it and the holder body 502.

The retaining arm assemblies 508 can also comprise an gripper portion 538 attached to the free end portion 514 of the retaining arms 510 on a hinge 540, as illustrated in FIGS. 11-13. The hinge 540 allows the gripper portion 538 to pivot around the free end portion 514 of the retaining arm 510 to which it is attached, so that the gripper portion 538 can be moved leftwards or rightwards as well as towards or away from the holder body 502. Advantageously, this allows the width of a gap, W (as shown in FIGS. 11 and 12), between the opposing retaining arms 510 to be precisely adjusted by rotating the engagement feature 128 around the free end portion 514 of its corresponding retaining arm 510, similarly to the adjustment of the similar features of the mobile device holder 100 previously discussed. Additionally, this combination of features allows the depth of the adjustable enclosure 506 to be similarly adjusted.

As shown in greater detail in FIG. 15, the hinge 540 can be formed from a first hinge portion 540b attached to or integrally formed with the gripper portion 538, and a second hinge portion 540a attached to or integrally formed with the free end portion 514 retaining arm 510. The first hinge portion 540b and the 526b can interconnect such that a channel 542 is formed extending axially through both the first hinge portion 540b and the second hinge portion 540a, as illustrated in FIG. 15. The channel 542 can receive a post or pin 544, and the gripper portion 538 can move pivotally around the pin 544 (that is, around a pivot axis or rotation axis parallel to the pin 544) and either away from or towards the holder body 502.

According to one aspect of the present disclosure, as illustrated in FIGS. 11 and 12, the gripper portion 538 can include a receiver portion 546. The receiver portion 546 can further include features similar to those previously discussed in relation to the receiver portion 129 previously introduced in relation to the mobile device holder 100.

In some examples, the one or more retaining arm assemblies 508 further include a radial biasing element 548 (such as the torsion spring 548) shown in FIG. 15. The radial biasing element 548 can be positioned between the gripper portion 538 and the free end portion 514 of the retaining arm 510 and can function in a substantially similar way to the radial biasing element 141 previously introduced in relation to the mobile device holder 100.

According to some examples, such as that illustrated in FIGS. 11-15, the retaining arm 510 of each of the one or more retaining arm assemblies 508 is attached to a bottom end portion 550 of the holder body 502, such that the one or more retaining arm assemblies 508 extend upwards from the bottom end portion 550 of the holder body 502 towards a top end portion 552 of the holder body 502. It will be appreciated, however, that in other examples, the retaining arm 510 of each of the one or more retaining arm assemblies 508 may be attached to the top end portion 552, such that the one or more retaining arm assemblies 508 extend downwards from the top end portion 552 towards the bottom end portion 550 of the holder body 502.

According to one aspect of the present disclosure, such as that illustrated in FIG. 11, the one or more retaining arm assemblies 508 can further include a roller 554 disposed at the free end portion 514 of the retaining arms 510. The roller 554 can engage with a mobile device as the mobile device is inserted into the adjustable enclosure 506 of the mobile device holder 500, and guide the mobile device towards a center portion of the adjustable enclosure 506. It will be appreciated that, while the one or more retaining arm assemblies 508 can include one or more rollers 554 as shown in FIG. 11, the one or more retaining arm assemblies 508 can also include one or more guiderails 556 positioned at the free end portion 514 of the retaining arms 510, as shown in FIG. 12. It will be appreciated that the one or more guiderails 556 can be included in addition to or in lieu of the rollers 554.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

We claim:

1. A self-adjusting mobile device holder comprising:
   a holder body;
   a bottom support bracket having a bottom portion extending in a forward direction from a lower portion of the holder body;
   a first retaining arm assembly including a first retaining arm and a first gripper portion connected to the first retaining arm; and a second retaining arm assembly including a second retaining arm and a second gripper portion connected to the second retaining arm, wherein the holder body, the bottom support bracket, and the first and second retaining arm assemblies together at least partially define an adjustable enclosure for receiving a mobile device;

wherein the first and second retaining arms are connected to opposite lateral sides of the holder body so that the first and second retaining arms can be moved laterally away from and toward each other to adjust a width of the enclosure; and wherein the first and second gripper portions are connected to the first and second retaining arms, respectively, so that the first and second gripper portions can be moved in a forward direction away from the holder body to adjust a depth of the enclosure to receive the mobile device in the enclosure or to release the mobile device from the enclosure.

2. The self-adjusting mobile device holder of claim 1, wherein:

the first and second retaining arms each include a mounting end portion pivotally connected to the holder body so that the first and second retaining arms are pivotable relative to the holder body around first and second pivot axes, respectively.

3. The self-adjusting mobile device holder of claim 2, wherein:

the first and second pivot axes are parallel to each other.

4. The self-adjusting mobile device holder of claim 2, wherein:

the first and second gripper portions are pivotally connected to the first and second retaining arms, respectively, so that the first and second gripper portions are pivotable relative to the first and second retaining arms around third and fourth pivot axes, respectively.

5. The self-adjusting mobile device holder of claim 4, wherein the first and second gripper portions comprise a receiver portion that extends away from the third and fourth pivot axes.

6. The self-adjusting mobile device holder of claim 4, wherein:

the third and fourth pivot axes are transverse to the first and second pivot axes, respectively.

7. The self-adjusting mobile device holder of claim 4, further comprising:

first and second retaining arm biasing springs biasing the first and second retaining arms laterally toward each other.

8. The self-adjusting mobile device holder of claim 7, further comprising:

first and second gripper portion biasing springs biasing the first and second gripper portions rearward toward the holder body.

9. The self-adjusting mobile device holder of claim 1, wherein:

the first and second retaining arms are resiliently biased toward each other.

10. The self-adjusting mobile device holder of claim 1, further comprising:

a roller disposed at a free end portion of each of the first and second retaining arms.

11. A mobile device holder comprising:

a holder body at least partially defining an adjustable enclosure; and an adjustable retaining device configured to retain a mobile device in the adjustable enclosure;

wherein the adjustable retaining device is movable from an undeflected state to a deflected state to adjust a size of the enclosure and admit the mobile device to the adjustable enclosure and resiliently biased to automatically return from the deflected state to the undeflected state when the mobile device is removed from the adjustable enclosure, and wherein the adjustable retaining device is movable relative to the holder body in at least a first direction and a second direction transverse to the first direction.

12. The mobile device holder of claim 11, wherein when the mobile device is introduced to the adjustable enclosure, the mobile device engages the retaining device and causes the retaining device to move from the undeflected state to the deflected state.

13. The mobile device holder of claim 11, wherein the adjustable enclosure is open at a top end, and can receive a mobile device that is introduced through the open top end and, wherein, when the mobile device is received by the enclosure, the mobile device is secured along at least a side portion by the adjustable retaining device.

14. The mobile device holder of claim 11, wherein the adjustable retaining device comprises a first retaining arm pivotally coupled to the holder body at a bottom end portion and a second retaining arm pivotally coupled to the holder body at the bottom end portion, and wherein the first retaining arm is rotationally movable in a first direction by pivoting about a first rotation axis extending along a thickness of the mobile device holder, and the second retaining arm is rotationally movable in a second direction opposite to the first direction by pivoting about a second rotation axis parallel to the first rotation axis.

15. The mobile device holder of claim 14, further comprising a first biasing element disposed between the retaining arm and the holder body and configured to return the retaining device to the undeflected state when no mobile device is within the enclosure.

16. The mobile device holder of claim 14, wherein the first retaining arm comprises a first gear portion and the second retaining arm comprises a second gear portion engaged with the first gear portion such that a rotational movement of the first retaining arm causes a corresponding rotational movement of the second retaining arm and a rotational movement of the second retaining arm causes a corresponding rotational movement of the first retaining arm.

17. The mobile device holder of claim 16, wherein when the adjustable retaining device moves from the undeflected state to the deflected state, the first retaining arm and the second retaining arm move further apart from one another.

18. The mobile device holder of claim 14, wherein the adjustable retaining device further comprises an engagement feature attached to a second end portion of the retaining arm by a hinge and configured to move in the second direction by rotating about a third rotation axis transverse to the first rotation axis.

19. The mobile device holder of claim 18, wherein the engagement feature comprises an angled receiver portion configured to engage a leading edge of the mobile device when the mobile device is introduced to the enclosure, and wherein the engagement between the leading edge of the mobile device and the angled receiver portion causes the engagement feature to rotate about the third rotation axis and away from the holder body.

20. The mobile device holder of claim 18, wherein the adjustable retaining device further comprises a biasing element disposed between the engagement feature and the retaining arm, configured to urge the engagement feature into contact with the holder body when no mobile device is in the enclosure.

* * * * *